United States Patent
Guerrini

(12) 
(10) Patent No.: US 11,026,374 B2
(45) Date of Patent: Jun. 8, 2021

(54) LANDSCAPING SUPPORT COMPONENT

(71) Applicant: Kyle Guerrini, Foxborough, MA (US)

(72) Inventor: Kyle Guerrini, Foxborough, MA (US)

(73) Assignee: Kyle Guerrini, Foxborough, MA (US)

( * ) Notice: Subject to any disclaimer, the term of this patent is extended or adjusted under 35 U.S.C. 154(b) by 0 days.

(21) Appl. No.: 16/670,671

(22) Filed: Oct. 31, 2019

(65) Prior Publication Data

US 2021/0127599 A1 May 6, 2021

(51) Int. Cl.
*A01G 9/28* (2018.01)
*E01C 11/22* (2006.01)

(52) U.S. Cl.
CPC .............. *A01G 9/28* (2018.02); *E01C 11/221* (2013.01)

(58) Field of Classification Search
CPC ......... A61G 9/28; E01C 11/221; E04H 4/141; E04H 4/142
USPC ............................. 52/102; 404/8; 47/32.7, 33
See application file for complete search history.

(56) References Cited

U.S. PATENT DOCUMENTS

| | | | | |
|---|---|---|---|---|
| 986,395 A | * | 3/1911 | King | A01G 9/28 47/33 |
| 3,676,952 A | * | 7/1972 | Watts | A01G 9/28 47/33 |
| 5,134,817 A | * | 8/1992 | Richardt | A01G 9/28 52/102 |
| D329,709 S | * | 9/1992 | Strobl, Jr. | D25/164 |
| 5,212,917 A | * | 5/1993 | Kurtz | A01G 9/28 52/102 |
| 5,240,343 A | * | 8/1993 | Strobl, Jr. | E01C 11/221 404/7 |
| D339,199 S | * | 9/1993 | Rynberk | D25/164 |
| 5,421,118 A | * | 6/1995 | Bauer | A01G 9/28 47/33 |
| D378,857 S | * | 4/1997 | Hale | D25/164 |
| 5,640,801 A | * | 6/1997 | Rynberk | A01G 9/28 47/33 |
| 5,771,643 A | * | 6/1998 | Parker | E02D 27/32 404/8 |
| 5,826,372 A | * | 10/1998 | Parsons | A01G 9/28 47/33 |
| 5,852,895 A | * | 12/1998 | Sinanan | A01G 9/022 47/33 |
| 5,857,288 A | * | 1/1999 | Wiste | A01G 9/28 47/33 |
| 5,930,947 A | * | 8/1999 | Eckhoff | E02D 29/0225 47/33 |
| 5,993,107 A | * | 11/1999 | Bauer | E01C 5/001 404/43 |
| 6,030,144 A | * | 2/2000 | Cannella | A01G 9/28 404/7 |
| 6,038,811 A | * | 3/2000 | Conway | A01G 9/28 47/33 |

(Continued)

OTHER PUBLICATIONS

"Pave Edge Industrial 12-10 Foot Sections" Pave Tech Probst Handling Equipment, <pavetech.com/pave-edge-industrial>, retrieved on Feb. 22, 2021 (2 pages).

*Primary Examiner* — Kyle J. Walraed-Sullivan
(74) *Attorney, Agent, or Firm* — Clark & Elbing LLP

(57) ABSTRACT

Disclosed herein is a landscaping support component and methods of use. The invention relates to the maintenance and partitioning of landscaping elements. In particular, the invention maintains the integrity of hardscape elements.

18 Claims, 12 Drawing Sheets

(56) References Cited

U.S. PATENT DOCUMENTS

| | | | | |
|---|---|---|---|---|
| 6,071,038 | A * | 6/2000 | Strobl, Jr. | E01C 11/221 404/7 |
| 6,085,458 | A * | 7/2000 | Gau | A01G 9/28 47/33 |
| 6,379,078 | B1 * | 4/2002 | Zwier | E01C 11/08 404/7 |
| 6,588,145 | B1 * | 7/2003 | Stovall, Jr. | A01G 9/28 47/33 |
| 6,594,959 | B2 * | 7/2003 | Whitson | A01G 9/28 52/102 |
| D516,228 | S * | 2/2006 | Dunbar | D25/113 |
| 7,174,690 | B2 * | 2/2007 | Zadeh | E04B 1/2403 52/712 |
| D541,952 | S * | 5/2007 | Keeley | D25/119 |
| 7,306,402 | B2 * | 12/2007 | Graber | E02B 5/02 405/121 |
| 7,555,863 | B1 * | 7/2009 | Caldwell | A01G 9/28 47/33 |
| D615,673 | S * | 5/2010 | Flynn | D25/164 |
| D733,936 | S * | 7/2015 | Amrine | D25/119 |
| 9,232,698 | B1 * | 1/2016 | Williams | A01G 9/28 |
| D748,822 | S * | 2/2016 | Amrine | D25/119 |
| D748,823 | S * | 2/2016 | Amrine | D25/119 |
| D773,074 | S * | 11/2016 | Amrine | D25/164 |
| D797,320 | S * | 9/2017 | Amrine | D25/164 |
| D800,352 | S * | 10/2017 | Amrine | D25/164 |
| D827,872 | S * | 9/2018 | Amrine | D25/164 |
| D840,058 | S * | 2/2019 | Amrine | D25/164 |
| D840,059 | S * | 2/2019 | Sanders | D25/164 |
| D862,281 | S * | 10/2019 | Atteberry | D11/143 |
| D881,663 | S * | 4/2020 | Atteberry | D8/9 |
| 10,662,607 | B2 * | 5/2020 | Trebil | E02D 31/02 |
| 2002/0121052 | A1 * | 9/2002 | Olink | E01C 11/221 52/102 |
| 2002/0139045 | A1 * | 10/2002 | Womack | A01K 63/00 47/33 |
| 2002/0141819 | A1 * | 10/2002 | Jones | E01C 11/221 404/7 |
| 2005/0198916 | A1 * | 9/2005 | Janesky | E02D 31/02 52/169.5 |
| 2005/0262780 | A1 * | 12/2005 | Bradley | E04H 4/141 52/169.7 |
| 2006/0188330 | A1 * | 8/2006 | Dunbar | E01C 11/221 404/8 |
| 2006/0207008 | A1 * | 9/2006 | Stancill | E04H 4/141 4/506 |
| 2007/0180764 | A1 * | 8/2007 | Forman | E01C 11/221 47/33 |
| 2007/0193112 | A1 * | 8/2007 | Olink | A01G 9/28 47/33 |
| 2008/0104896 | A1 * | 5/2008 | Strobl | A01G 9/28 52/101 |
| 2008/0163566 | A1 * | 7/2008 | Bella | A01G 9/28 52/102 |
| 2008/0235921 | A1 * | 10/2008 | Zwier | A01G 9/28 24/545 |
| 2009/0013597 | A1 * | 1/2009 | Orton | A01G 9/28 47/33 |
| 2009/0038238 | A1 * | 2/2009 | Kurtz | A01G 9/28 52/102 |
| 2009/0060656 | A1 * | 3/2009 | Szkola | E01C 11/221 404/68 |
| 2009/0183445 | A1 * | 7/2009 | McPherson | E02D 31/02 52/169.5 |
| 2009/0232597 | A1 * | 9/2009 | Zwier | E01C 11/221 404/17 |
| 2010/0050505 | A1 * | 3/2010 | Zwier | A01G 9/28 47/33 |
| 2010/0226720 | A1 * | 9/2010 | Meert | A01G 9/28 405/121 |
| 2013/0031848 | A1 * | 2/2013 | Perotti | E04B 2/08 52/102 |
| 2014/0041293 | A1 * | 2/2014 | Kellogg | A01G 9/28 47/33 |
| 2015/0252532 | A1 * | 9/2015 | Alfieri, III | E01C 5/005 404/37 |
| 2015/0252536 | A1 * | 9/2015 | Alfieri, III | E01C 11/221 404/7 |
| 2016/0069071 | A1 * | 3/2016 | Remmele | E04C 2/34 52/232 |
| 2017/0034999 | A1 * | 2/2017 | Tyrrel | A01G 9/28 |
| 2018/0216309 | A1 * | 8/2018 | McPherson | E04B 1/7038 |

* cited by examiner

LANDSCAPING SUPPORT COMPONENT

BACKGROUND OF THE INVENTION

In landscaping, there exists a need to partition different areas as well as a need to maintain the integrity of each area. One such instance of the need for partitioning, is the construction of walkways that pass through areas with substantially different physical properties (e.g., a brick path set in an area with soft soil). In such a situation, disruption of the integrity of the walkway can occur through displacement of individual components of the walkway, erosion of the base material underlying the walkway, and differential settling of the individual components of the walkway. This problem is further compounded by differences in slope and is especially apparent in a case where the slope is of such difference that it requires a stairway. The standard approach to address this problem is to use edge restraints that help protect the walkway from horizontal displacement; however, this approach often proves inadequate in areas of high stress (e.g., where a walkway meets a stairway: FIG. 1) and provides little protection from erosion of the underlying base material or the differential settling that results from it (FIG. 2). This type of failure is expected by the industry and replacement of the underlying base and reinstallation of the walkway components is often included in the initial costs of the installation. Reapplication of the initial approach (e.g., periodic reinstallation of edge restraints and replacement of eroded fine material) that resulted in the problem, despite the expectation of failure, is common and highlights an unmet need in the industry.

SUMMARY OF THE INVENTION

In general, the invention provides a landscaping support component that maintains the integrity of landscaping elements.

A first aspect of the invention features a landscaping support component containing: (i) a substantially planar base containing a surface; (ii) a front wall containing a vertical surface with upper and lower edges, wherein the lower edge of the vertical surface is connected at a front edge of the planar base and the vertical surface extends substantially perpendicularly upwards from the planar base; and (iii) two opposing side walls that are substantially perpendicular to the planar base, have respective upper and lower edges, are connected on opposite ends of the substantially planar base, and intersect at a front end with the vertical surface.

In some embodiments, the substantially planar base contains at least one perforation. In certain embodiments, the perforation contains a drainage or weep hole. In some embodiments, the perforation permits passage of a nail or spike.

In any of the preceding embodiments, the landscaping support component is a single unitary piece of rigid material.

In other embodiments, the planar base, front wall and/or opposing side walls of the landscaping support component are modular and are detachably connected.

In any of the preceding embodiments, the side walls of the landscaping support component contain a notch. In certain embodiments, the notch is sized to accommodate placement of a restraining edge.

In any of the preceding embodiments, the substantially planar base of the landscaping support component contains at least one groove.

In any of the preceding embodiments, the landscaping support component contains at least one breakaway tab, the removal of which creates a perforation. In certain embodiments, the landscaping support component further contains a plug for insertion into the perforation resulting from removal of the breakaway tab.

In any of the preceding embodiments, the landscaping support component contains at least one visible indication (6) providing a guide for cutting. In certain embodiments, at least one indication is a line that is parallel to the side walls.

In any of the preceding embodiments, the landscaping support component contains at least one visible indication (6) providing a guide for forming a perforation.

In any of the preceding embodiments, the landscaping support component contains a semipermeable material.

In any of the preceding embodiments, the opposing side walls of the landscaping support component are about 0.5 ft. to about 8.0 ft. apart, e.g., about 0.5 ft., 0.6 ft., 0.7 ft., 0.75 ft., 0.8 ft., 0.9 ft., 1.0 ft., 1.1 ft., 1.2 ft., 1.25 ft., 1.3 ft., 1.4 ft., 1.5 ft., 1.75 ft., 2.0 ft., 2.25 ft., 2.5 ft., 3.0 ft., 3.5 ft., 4.0 ft., 5.0 ft., 6.0 ft., 7.0 ft., 8.0 ft., or a value in a range spanning any of the preceding values.

In any of the preceding embodiments, the substantially planar base has a length of about 0.5 ft. to about 4.0 ft, e.g., about 0.5 ft., 0.6 ft., 0.7 ft., 0.75 ft., 0.8 ft., 0.9 ft., 1.0 ft., 1.1 ft., 1.2 ft., 1.25 ft., 1.3 ft., 1.4 ft., 1.5 ft., 1.75 ft., 2.0 ft., 2.25 ft., 2.5 ft., 3.0 ft., 3.5 ft., 4.0 ft., or a value in a range spanning any of the preceding values.

In any of the preceding embodiments, the front wall has a height of about 0.25 ft. to about 4.0 ft., e.g., about 0.25 ft., 0.3 ft., 0.4 ft., 0.5 ft., 0.6 ft., 0.7 ft., 0.75 ft., 0.8 ft., 0.9 ft., 1.0 ft., 1.1 ft., 1.2 ft., 1.25 ft., 1.3 ft., 1.4 ft., 1.5 ft., 1.75 ft., 2.0 ft., 2.25 ft., 2.5 ft., 3.0 ft., 3.5 ft., 4.0 ft., or a value in a range spanning any of the preceding values.

In a second aspect, the invention features a method for installing the landscaping support component of the first aspect of the invention into a landscape containing the steps of: (a) placing the landscaping support component on level ground where the front side of the landscaping support component will be flush with a hardscaping element and (b) installing hardscape components within the bounds of the landscaping support component.

In some embodiments of the second aspect of the invention, the landscaping support component is infilled with material that will uphold hardscape components. In some embodiments, the infill material is compacted. In certain embodiments, the infill material is sand and/or gravel.

In any of the preceding embodiments of the second aspect of the invention, the hardscaping element is a stairway. In some embodiments, the hardscape components are pavers, bricks, planks, and/or stones.

In any of the preceding embodiments of the second aspect of the invention, the method further includes installing at least one anchoring element through the planar base to secure the landscaping support component to the ground. In certain embodiments, the method further includes installing at least one anchoring element through the front wall of the landscaping support component. In some embodiments, the method further includes installing at least one anchoring element through at least one of the side walls of the landscaping support component. In some embodiments, the anchoring element is a substantially cylindrical object. In certain embodiments, at least one anchoring element is a metal spike. In some embodiments, at least one anchoring element is a nail.

In any of the preceding embodiments of the second aspect of the invention, the method further includes forming at least one perforation in the landscaping support component. In certain embodiments, at least one perforation is formed by removing one or more breakaway tabs, thereby creating the perforation.

In any of the preceding embodiments of the second aspect of the invention, the method further includes inserting at least one plug into a perforation.

In a third aspect, the invention features a kit including the landscaping support component of the first aspect of the invention. In certain embodiments, the kit includes one or more metal spikes. In some embodiments, the kit includes one or more plugs. In certain embodiments, the kit includes one or more edge restrains. In some embodiments, the kit includes installation instructions.

BRIEF DESCRIPTION OF THE DRAWINGS

The accompanying drawings are included to illustrate embodiments of the landscaping support component and further an understanding of its implementations.

DETAILED DESCRIPTION

Described herein are a landscaping support component and methods for maintaining the boundaries and integrity of landscaping elements (e.g., hardscape components, such as stairs) using the landscaping support component. The landscaping support component is designed to address deficiencies in traditional approaches to the installation and maintenance of landscaping elements. In particular, the landscaping support component is designed to maintain the integrity of hardscape elements by preventing or significantly reducing their horizontal displacement and the erosion of surrounding and adjacent materials. The landscaping support component accomplishes this function with a minimal visible profile, contrasting with the installation of previously used components, such as a concrete edge support or a retaining wall.

The landscaping support component confines materials upholding hardscaping elements (e.g., walkway components), thereby preventing or reducing erosion and other forms of displacement (e.g., sand and/or soil surrounding or adjacent to the hardscaping components). The landscaping support component also confines hardscaping components (e.g., bricks, stones, pavers, planks, etc.) by preventing or reducing their horizontal displacement (e.g., from impact stress or erosion of underlying fine and/or base material). The landscaping support component also prevents movement of fine material through porous landscaping components (e.g., porous steps). Furthermore, the landscaping support component is resistant to displacement from the site of installation due to its installation below ground and is further kept in place due to the weight of the fine material and base material that is used for infilling and by the use of optional anchoring elements.

The landscaping support component is designed to be easily incorporated into a landscape (e.g., a hardscape) project and/or a landscape repair or reinstallation project, such as a walkway (e.g., a walkway including steps).

Figure 1:
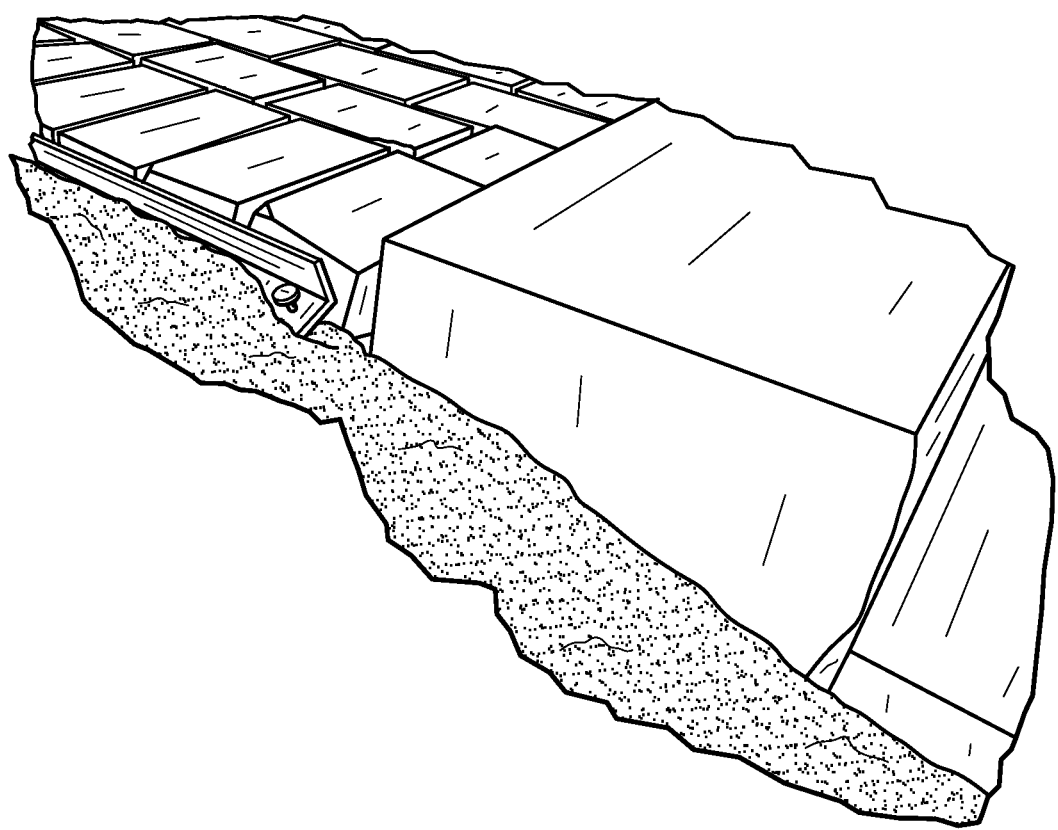
FIG. 1 is an image showing a common failure of a prior art edge restraints to maintain the integrity of a walkway in an area where the walkway meets a stairway.
Figure 2:
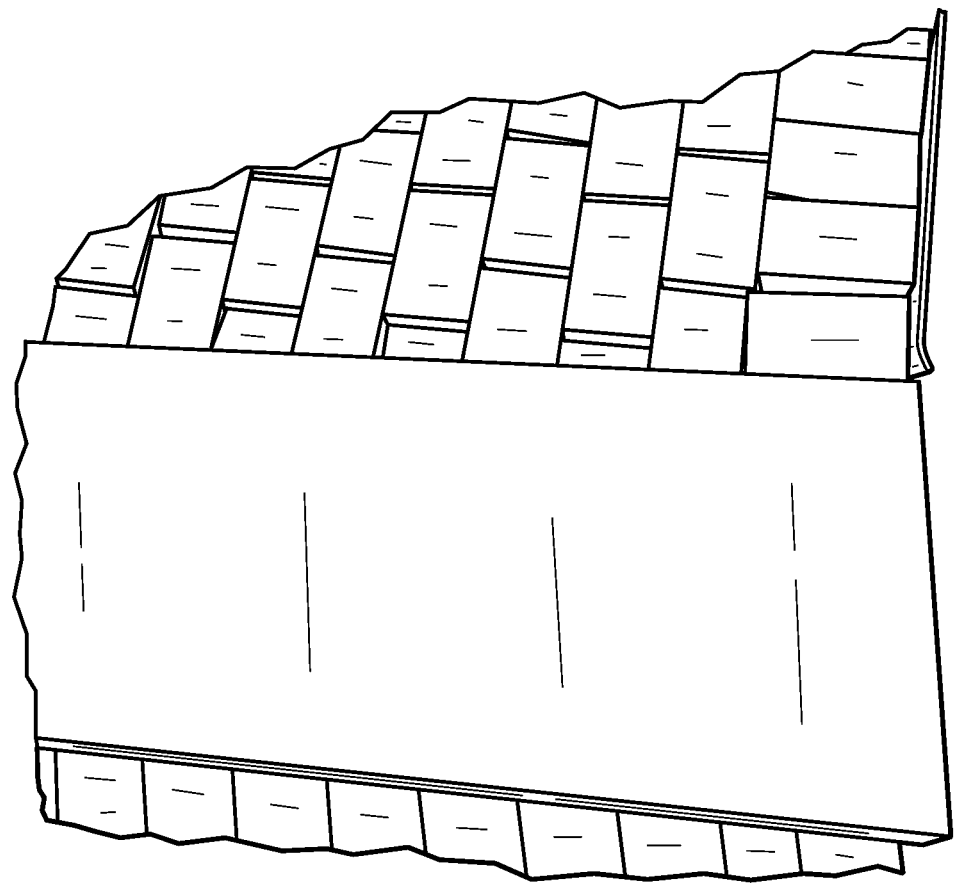
FIG. 2 is an image showing the differential settling and horizontal displacement of a prior art walkway component where an edge restraint failed to maintain the integrity of the walkway.
Figure 3:
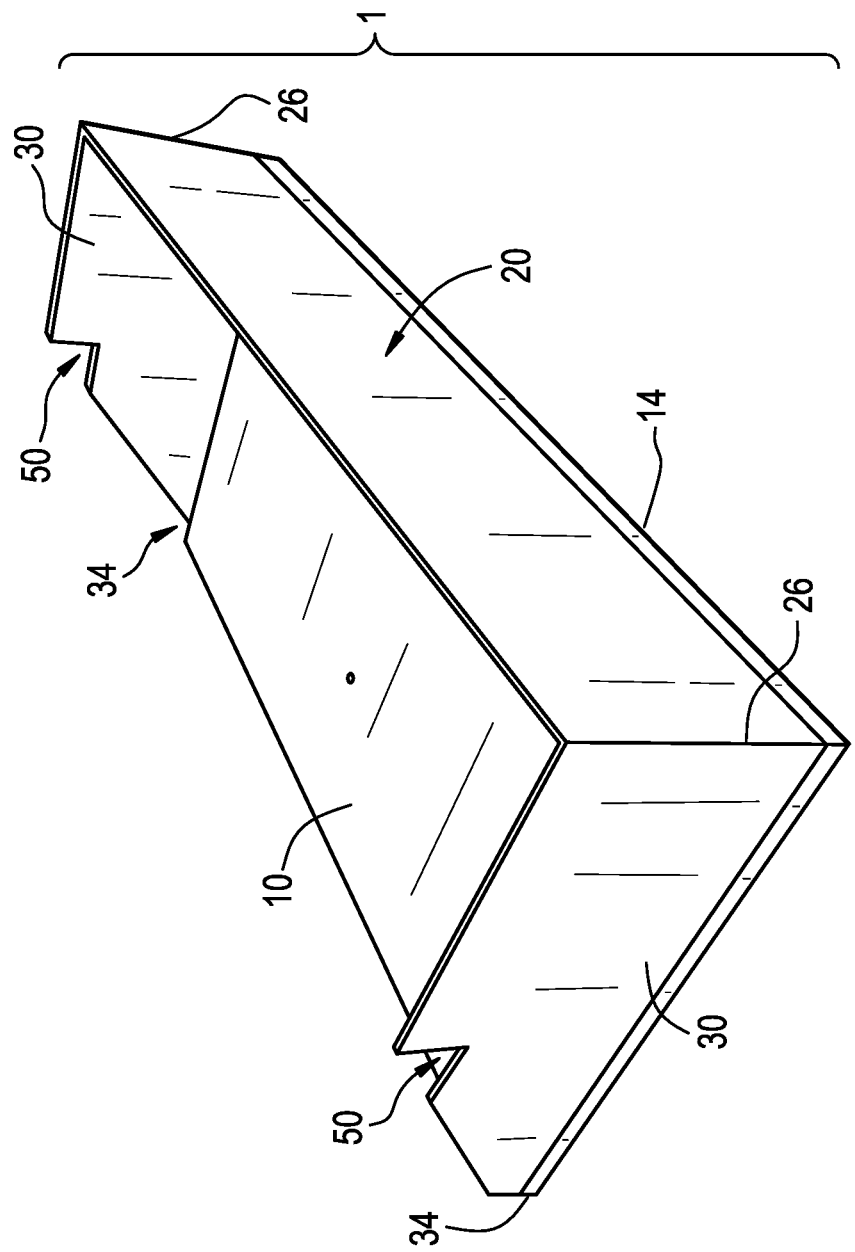
FIG. 3 is a side perspective view of landscaping support component (1).

An example of a landscaping support component, described herein, is depicted in FIG. 3.

Landscaping Support Component

With reference to FIG. 3, landscaping support component (1) has a substantially planar base (10), an interconnected front wall (20) arising from a front edge (14) of substantially planar base (10), and two opposing side walls (30) that are attached to substantially planar base (10) at side edge (34), with front wall (20) attached to side walls (30) at side corner (26). Landscaping support component (1) can be made of hard plastic or other type of rigid or semi-rigid material or a combination of materials, such as metal (e.g., steel, aluminum, brass), wood, concrete (e.g., reinforced concrete), polyplastic, rubber, synthetic (e.g., a resin), or a composite.

Landscaping support component (1) can be formed with several different thicknesses. In particular, the thickness of the material that forms the landscaping support component (1) can depend upon the material used as well as the desired implementation. For example, the thickness of planar base (10), front wall (20), and side walls (30) can be about 0.06-2.0 in. (e.g., about 0.06, 0.07, 0.08, 0.09, 0.1, 0.125, 0.2, 0.25, 0.3, 0.375, 0.4, 0.5, 0.6, 0.625, 0.7, 0.75, 0.8, 0.875, 0.9, 1.0, 1.25, 1.5, 1.75, 2.0 in.), such as about 0.25 in. As used herein, the term "about" means±10% of the recited value. The thickness of the material may be uniform across the entire landscaping support component (1), or the thickness may vary (e.g., side walls (30) can be thicker or thinner than front wall (20), planar base (10) can be thicker or thinner than side walls (30), planar base (10) can be thicker or thinner in some areas to create grooves).

Landscaping support component (1) can comprise a single unitary piece of rigid material or it can be modular. A modular landscaping support component may comprise an attachable or detachable planar base (10), front wall (20), and/or side wall (30).

Landscaping support component (1) can contain one or more perforations in planar base (10), front wall (20), or side walls (30). Perforations may be drainage perforations (44) or anchoring perforations (46), or both. Perforations may be pre-formed in landscaping support component (1), or may be formed through additional action. For example, breakaway tabs (45) can be present in landscaping support component (1), where removal of the tab forms a perforation. For example, breakaway tabs can be formed with one or more concentric circles of different diameters (e.g., innermost circle with a diameter of about 0.1 in., intermediate circle with a diameter of 0.25 in., outermost circle with a diameter of 0.6 in.), where removal of the tabs from inside to out creates larger and larger holes. Perforations may also contain plugs (47), where removal of the plug reveals a perforation.

Portions of landscaping support component (1) can be visible (see, e.g., FIG. 5 and FIG. 11) and can be paintable or can be a color that blends with landscape elements or is otherwise aesthetically pleasing, typically black or brown (tan) or green.

Structure of the Landscaping Support Component

Figure 4:
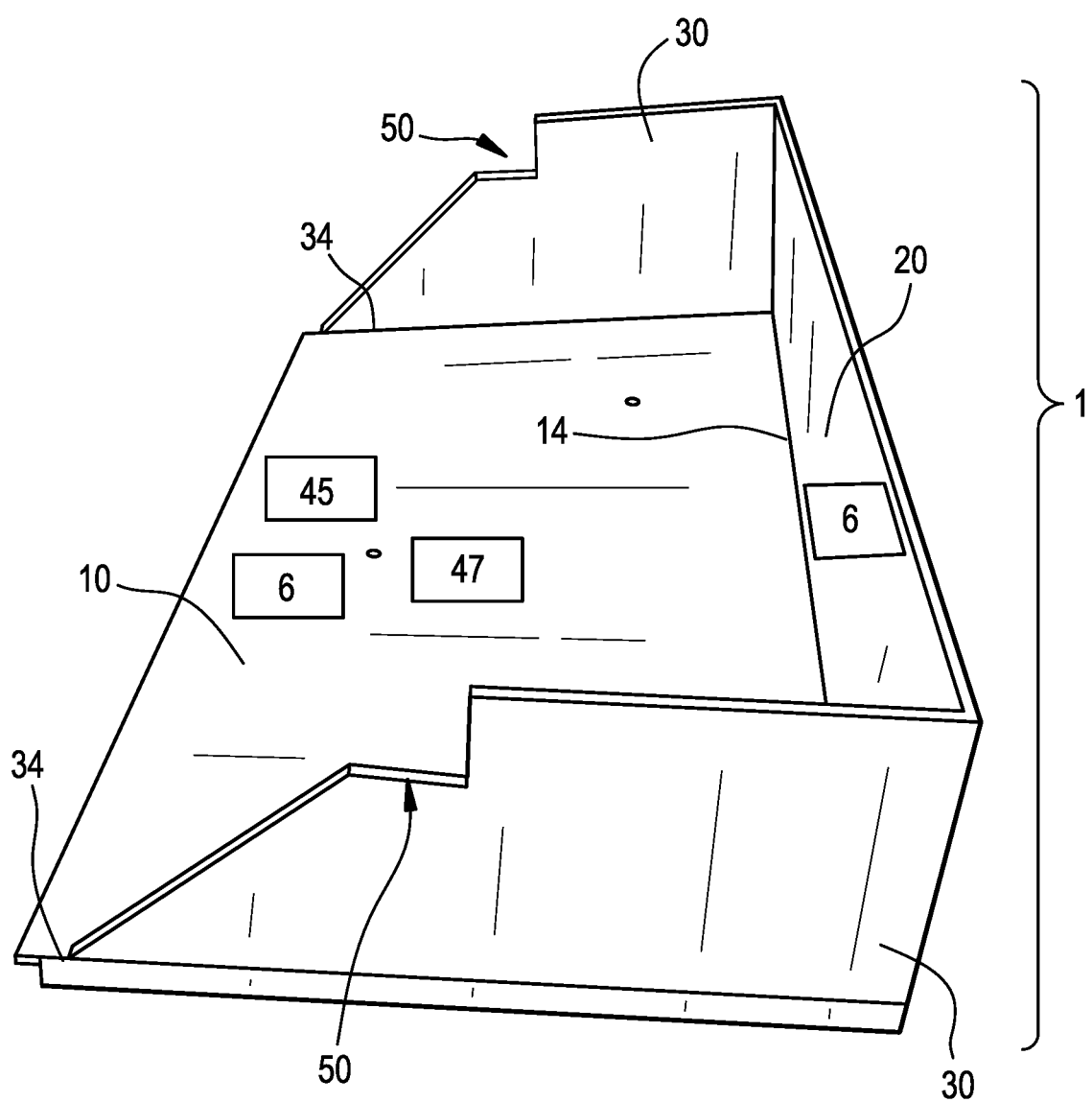
FIG. 4 is an image showing a side perspective view of landscaping support component (1).

With regard to FIG. 3, landscaping support component (1) can be formed with substantially planar base (10), front wall (20), and two side walls (30). Used herein, "substantially planar" means a surface that does not deviate from its axes by more than +/−10 degrees. As shown in FIG. 4, front wall (20) can arise from front edge (14) of planar base (10) at an angle that is substantially perpendicular and that attaches to or interconnects with each side wall (30) at an angle that is substantially perpendicular.

Used herein, "substantially perpendicular" means that a surface is at an angle of about 90 degrees (+/−10%) from a reference surface. As shown in FIG. 4, side walls (30) can arise from the opposing side edges of planar base (10) at angle that is substantially perpendicular and that attaches to or interconnects with front wall (20) at front edge (14). Front wall (20) and side walls (30) may arise from planar base (10) at other angles (e.g., about 45°-135°, such as 45°, 60°, 80°, 100°, 120°, or 135°) or may arise at one angle (e.g., about 45°-135°, such as 45°, 60°, 80°, 90°, 100°, 120°, or 135°), with one or more angle changes across a length of front wall (20) or side walls (30).

Description and Dimensions of the Landscaping Support Component

The dimensions of landscaping support component (1) may depend upon the desired implementation. Landscaping support component (1) may be at least about 0.5-8.0 ft. in width (e.g., about 0.5, 0.6, 0.7, 0.75, 0.8, 0.9, 1.0, 1.1, 1.2, 1.25, 1.3, 1.4, 1.5, 1.75, 2.0, 2.25, 2.5, 3.0, 3.5, 4.0, 5.0, 6.0, 7.0, 8.0 ft. wide), such as about 2 ft. in width (from one side wall (30) to the other side wall (30)), about 0.5-4.0 ft in length (e.g., about 0.5, 0.6, 0.7, 0.75, 0.8, 0.9, 1.0, 1.1, 1.2, 1.25, 1.3, 1.4, 1.5, 1.75, 2.0, 2.25, 2.5, 3.0, 3.5, 4.0 ft. long), such as about 1.25 ft. in length (from front wall (20) to the farthest edge of planar base (10)), and about 0.25-4.0 ft. in height (e.g., about 0.25, 0.3, 0.4, 0.5, 0.6, 0.7, 0.75, 0.8, 0.9, 1.0, 1.1, 1.2, 1.25, 1.3, 1.4, 1.5, 1.75, 2.0, 2.25, 2.5, 3.0, 3.5, 4.0 ft. high), such as about 0.5 ft. in height. The width of landscaping support component (1) may depend on the bounds of the landscape elements that are enclosed between side walls (30) (e.g., the width and length of a landscape project or hardscape component, such as a walkway or set of steps). The height of front wall (20) and side walls (30) and the length of planar base (10) may depend on the expected amount of stress to be placed on the landscape elements enclosed within landscaping support component (1) and the type of ground in which landscaping support component (1) is to be installed, the type of fine material for use with landscaping support component (1), and the presence or absence, and/or type of, anchoring elements (70) to be used with landscaping support component (1).

For example, a landscaping support component that maintains the integrity of a walkway with a width of 6 ft may have dimensions of about 6'×3'×1' (W×L×H). A landscaping support component that maintains the integrity of a similar walkway, but with a higher expected stress load, may have dimensions of about 6'×4'×1.5' (W×L×H) or dimensions of about 6'×3'×1' (W×L×H), but with additional anchoring elements to securely fasten the landscaping support component to the ground.

Planar base (10) of landscaping support component (1) may contain perforations (44) for drainage. The diameter of perforations (44) may typically range from about 0.08 in. to about 0.3 in., with both the number and size depending upon the particle size of the material filling the landscaping support component (1) and the expected demand for liquid drainage in a particular environment. For example, landscaping support component (1) may be installed in an arid climate and may have few, if any, drainage perforations (44). Alternatively, landscaping support component (1) may be installed in a tropical climate and may have many drainage perforations (44).

Planar base (10) of landscaping support component (1) may contain perforations (46) for anchoring elements (70). The diameter of perforations (46) for anchoring elements (70) may range from approximately about 0.1 in. on the low end (e.g., for accommodating nails) to approximately about 1.0 in. on the high end (e.g., for accommodating larger landscaping spikes) and both the size and number may depend upon the desired amount of anchoring and the material to which landscaping support component (1) will be anchored.

Front wall (20) may contain perforations for anchoring elements (70). The diameter of the perforations may range from about 0.1 in. to about 0.6 in.; however, both the size and number can be selected based upon the desired amount of anchoring and the material to which landscaping support component (1) will be anchored.

Figure 5:
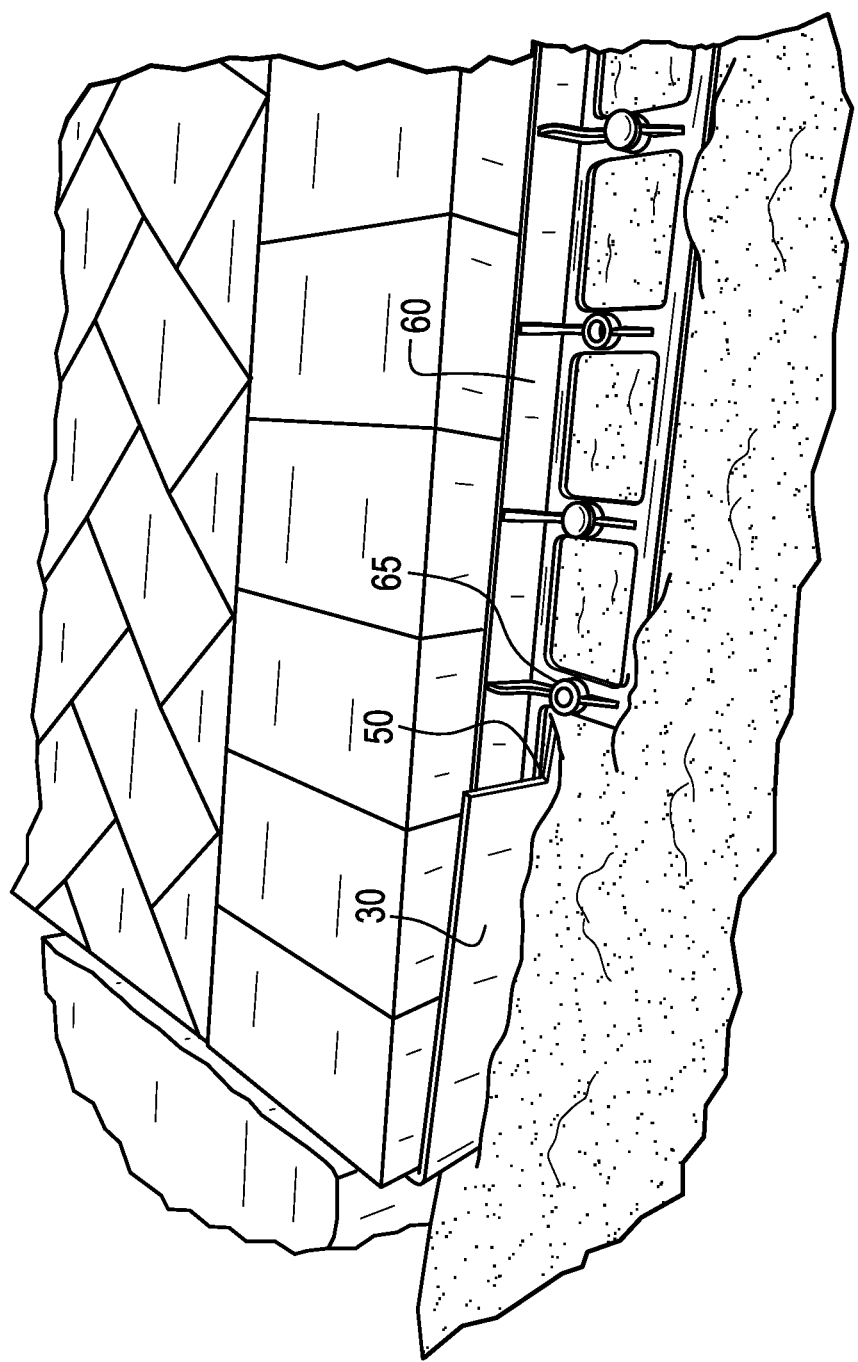
FIG. 5 is an image showing an example installation of landscaping support component (1) with seamless integration of edge restraints (60).

Side walls (30) may contain additional element (50), which may be a notch, a protrusion, or both. The notches or protrusions can accommodate the fitting or attachment of industry standard side restraints (60) to the landscaping support component (1) (FIG. 5). Notch (50) in the side wall may be sized to match the height of the side restraints used, which are typically about 1 in. to about 3 in. in height. Protrusions could extend over, under, or along the edge restraints to facilitate attachment (e.g., alignment of side restraint anchoring perforations (65)).

Additional embodiments may contain plugged perforations within planar base (10) that can be easily removed to accommodate additional or differential placement of anchoring elements (70). Landscaping support component (1) may contain pre-indicated guide lines for cutting into multiple pieces to accommodate longer or shorter walkway widths or other landscape elements. Planar base (10) may contain multiple grooves that aid in drainage (e.g., grooves that direct the flow of liquid toward drainage perforations) and anchoring.

Operation of the Landscaping Support Component

Landscaping support component (1) can be used to maintain the integrity of landscape elements. For example, landscaping support component (1) can be used to maintain the integrity of a walkway. In particular, landscaping support component (1) can be used to maintain the integrity of a walkway that abuts the top step of a stairway.

Figure 10:
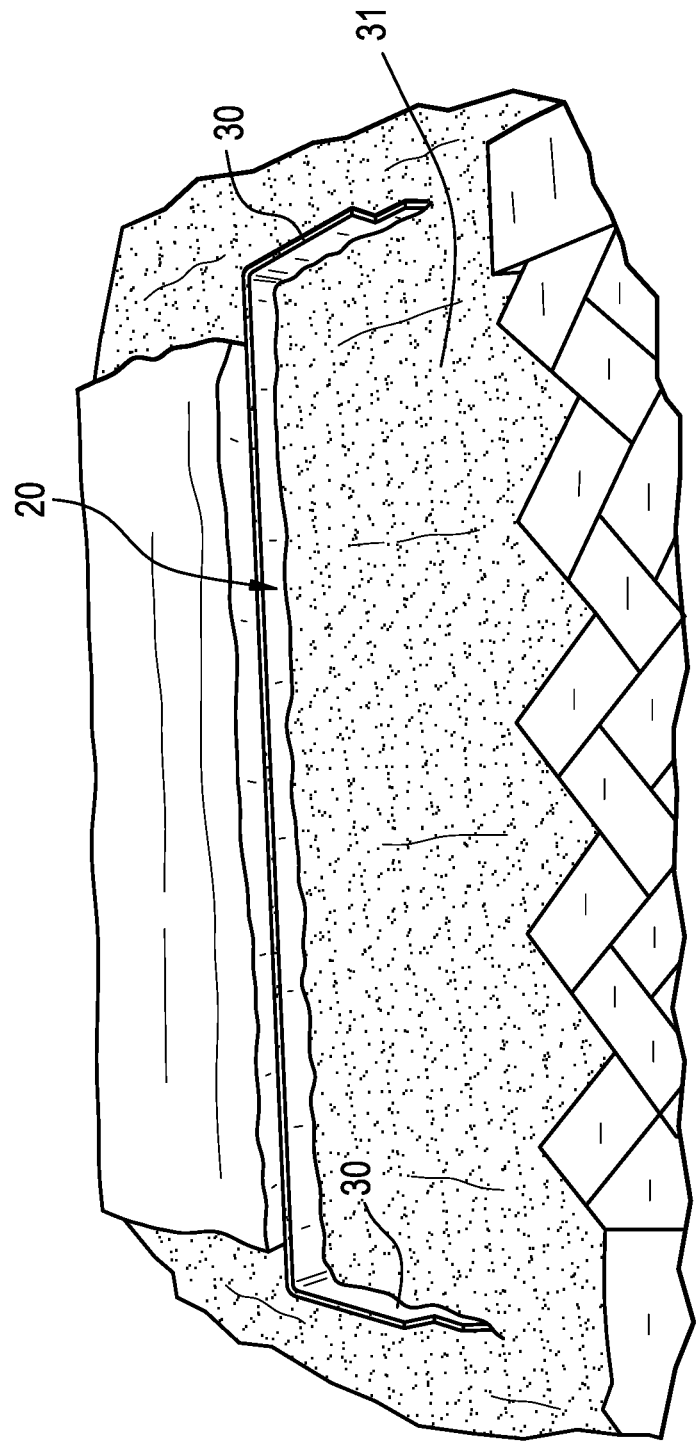
FIG. 10 is an image showing infilling of landscaping support component (1) shown in FIG. 9 with fine material.
Figure 11:
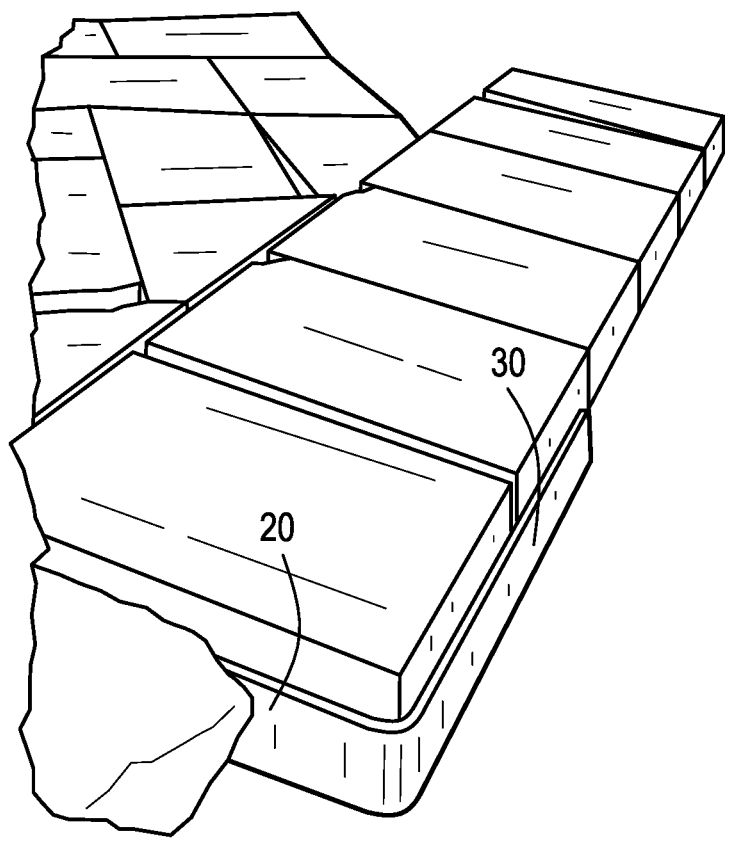
FIG. 11 is an image showing an angled view of stone walkway components installed on top of landscaping support component (1).

In one mode of operation, an operator can install landscaping support component (1) at the intersection of a walkway and a top step of (or one or more steps of) a stairway such that front wall (20) is recessed relative to the top step. Alternatively, the landscaping support component could be substantially flush with the top step of the stairway (see, e.g., FIG. 10). The walkway components can be positioned above planar base (10) and enclosed within the lateral boundaries of front wall (20) and side walls (30). Landscaping support component (1) can be at least partially or fully sub-terranean (FIG. 11). In this mode of operation, front wall (20) and side walls (30) secure the walkway components from horizontal displacement and the combination of planar base (10), front wall (20), and side walls (30) secures the base and fine materials from erosion, preventing or substantially reducing vertical displacement (e.g., differential settling) of the walkway components, in particular, over time (e.g., six months, 1 year, 2 years. 3 years, 4 years, 5 years, etc.).

Figure 8:
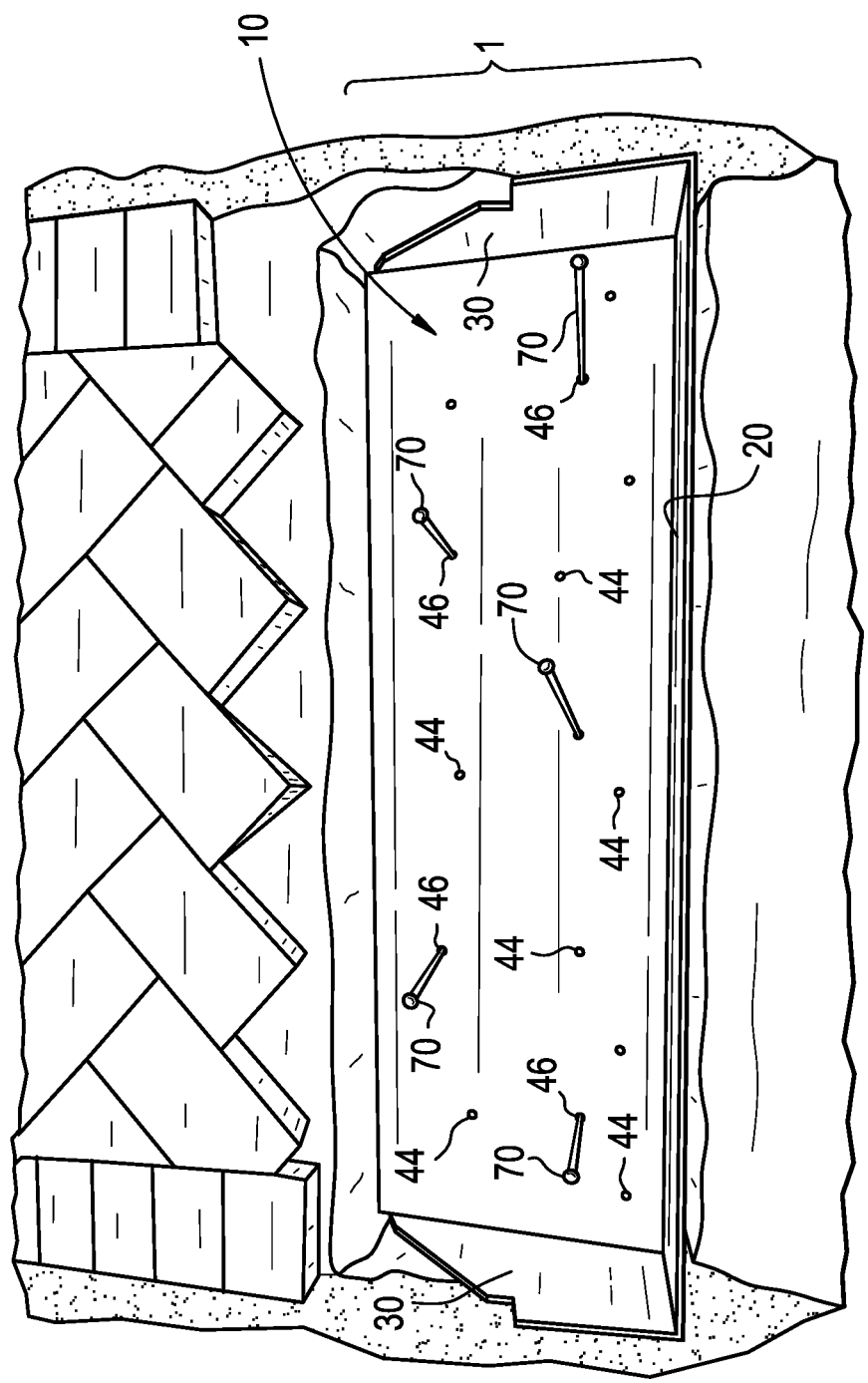
FIG. 8 is an image showing installation of landscaping support component (1) into the walkway shown in FIG. 7.
Figure 12:
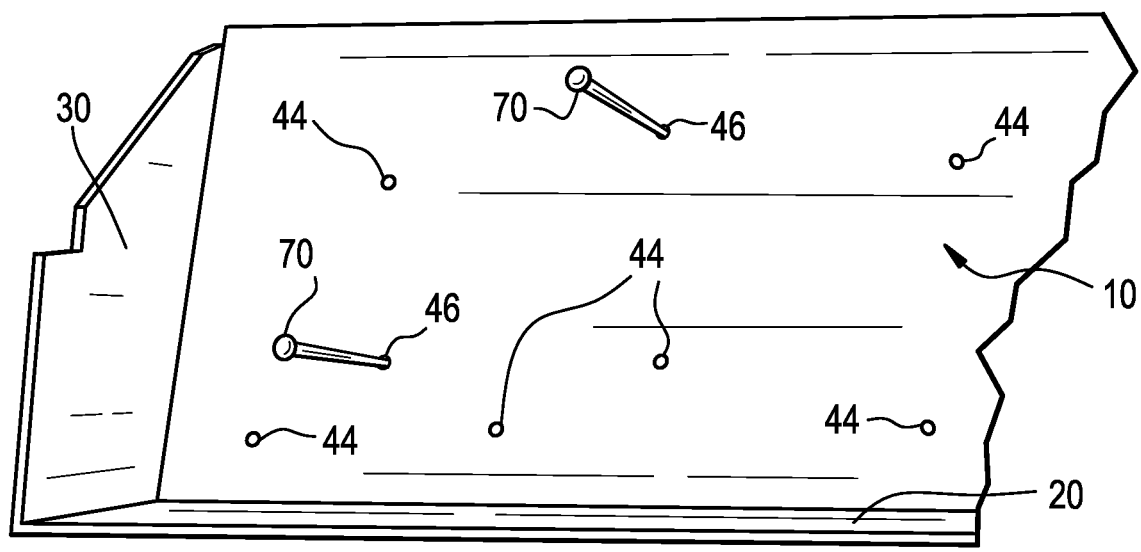
FIG. 12 is a closeup view looking down onto planar base (10) of landscaping support component (1) shown in FIG. 8 and showing drainage perforations (44), anchoring perforations (46), and anchoring elements (70).

In other aspects, landscaping support component (1) can be anchored in place with anchoring elements (70) that penetrate planar base (10), front wall (20), side walls (30), or a combination thereof (see, e.g., FIG. 8 and FIG. 12).

Landscaping support component (1) can also be installed at the intersection of a walkway and the bottom step of a stairway.

Landscaping support component (1) can also be installed at the edge of a patio. In this mode of operation, the components that form the patio (e.g., pavers, bricks, tiles, stone, concrete, or wood) are held in place by landscaping support component (1).

Landscaping support component (1) can also be installed at the intersection of a softscape (e.g., a lawn area) with steps (e.g., floating steps abutting a lawn area or continuous steps stacked up a grade). In this mode of operation, landscaping support component (1) can be installed at any or every step.

Landscaping support component (1) can also be installed at the termination of a walkway. In this mode of operation, the terminal end of the walkway can intersect with other hardscape elements such as a patio, deck, driveway, gazebo, pergola, or ramada. In other aspects, the terminal end of the walkway may be detached from hardscape elements or otherwise be freestanding.

Operation of the Landscaping Support Component for Repair

Figure 6:
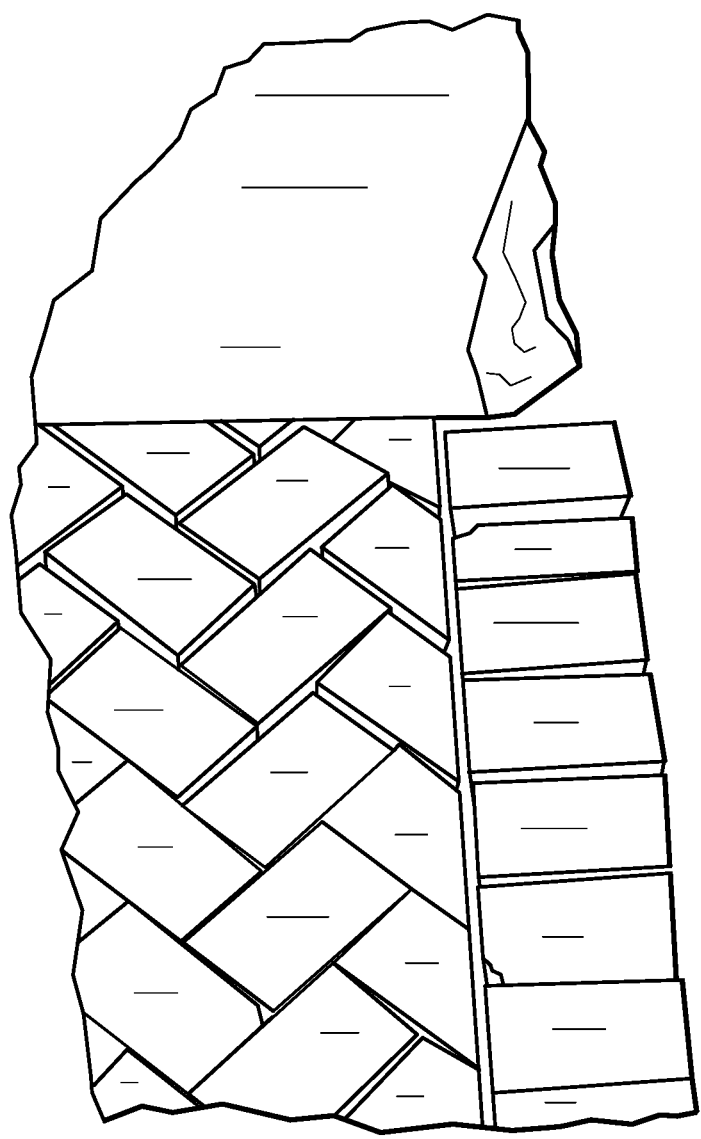
FIG. 6 is an image showing a top view of a walkway with displaced components prior to repair with landscaping support component (1).
Figure 7:
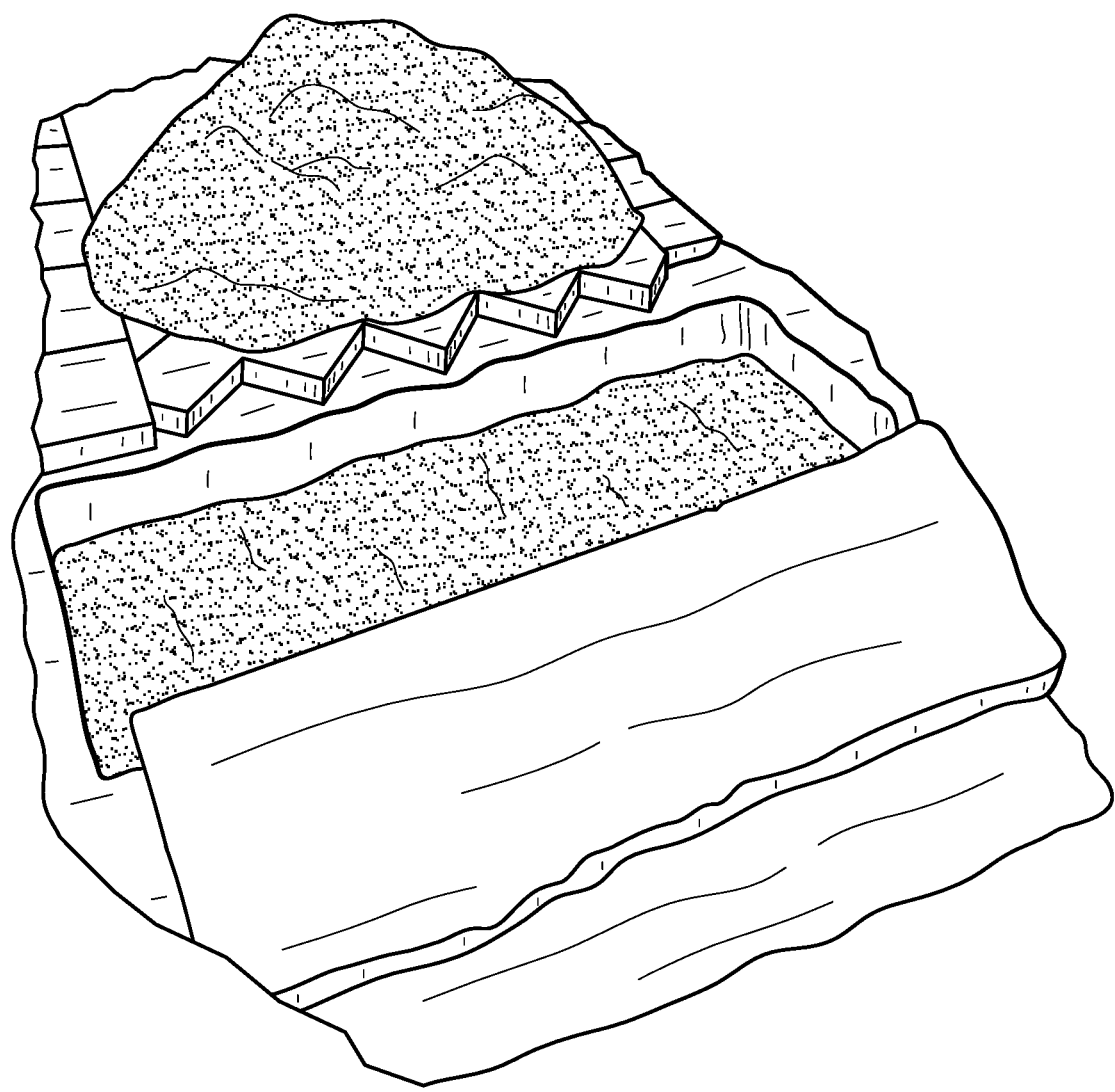
FIG. 7 is an image showing the removal of the underlying gravel base of the walkway of FIG. 6.
Figure 9:
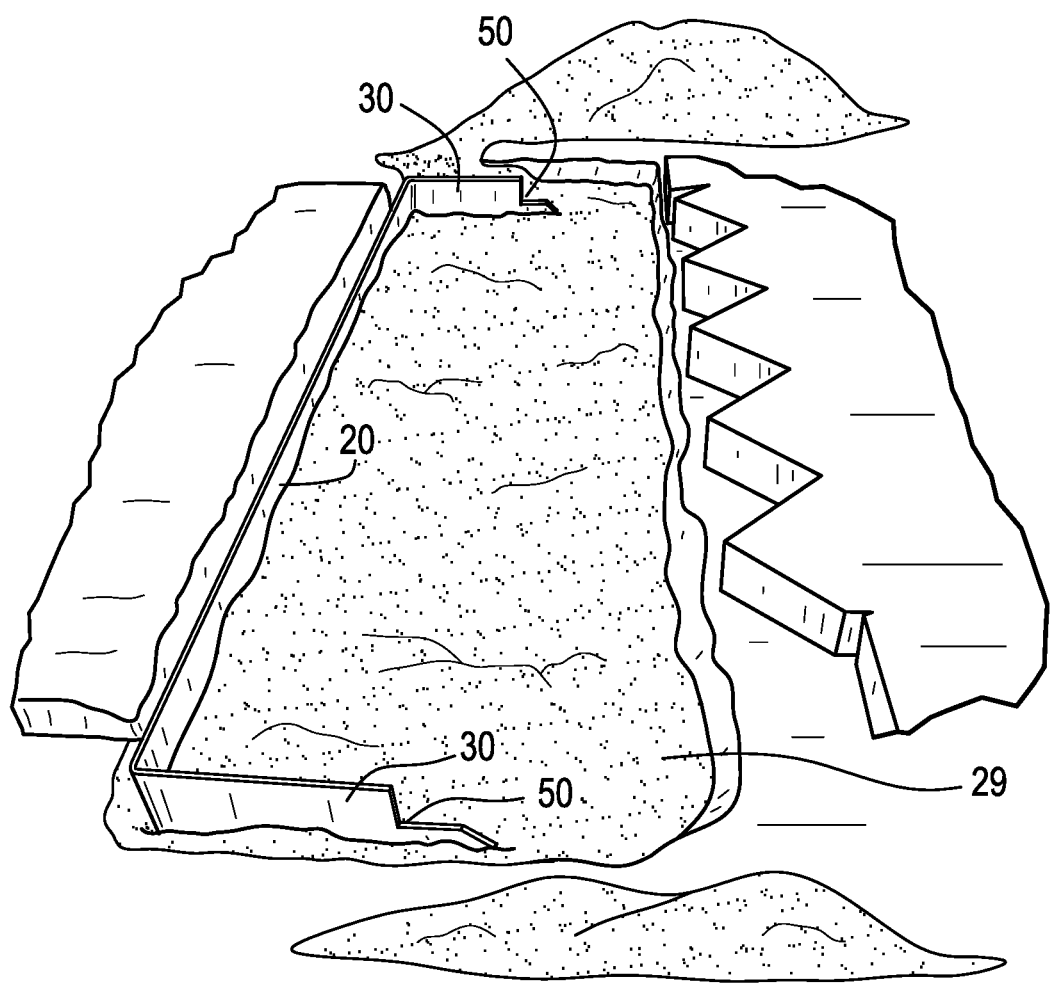
FIG. 9 is an image showing infilling of landscaping support component (1) shown in FIG. 8 with compacted base material.

Landscaping support component (1) can also be installed to maintain the integrity of a walkway as part of a repair procedure for a walkway that has suffered displacement of individual walkway components. For example, when an existing walkway that lacks sufficient support fails in an area of high stress (e.g., where a walkway meets a stairway: FIG. 6), the landscaping support component (1) can be used as part of the reinstallation procedure. The installer first removes the walkway components from the area and the fine material base with which they are set. The installer excavates the base materials (e.g., gravel) to produce a level floor with a compacted base material of a sufficient depth for the landscaping support component (1) (FIG. 7). The landscaping support component can then be placed against the back of the top step and leveled prior to installation of anchoring elements (FIG. 8). Base material can then be compacted within the landscaping support component (1) (FIG. 9) and used as a base for the fine material (FIG. 10). Walkway components can then be installed atop the fine material and within the confines of front wall (20) and side walls (30) of landscaping support component (1) (FIG. 11). After installation of the walkway components, edge restraint (60) can be installed to abut side wall (30) (see, e.g., FIG. 5).

Landscaping support component (1) can be installed along with a walkway, de novo, and can be seamlessly integrated within the final hardscape. While laying of the base layer under a walkway, landscaping support component (1) can be installed on a compacted, level floor against the top step of a stairway similar to that shown in FIG. 8. Infilled material corresponding to base material (29) and fine material (31) can then be infilled within landscaping support component (1) prior to installation of the walkway components.

Kits Containing the Landscaping Support Component

FIGS. 3 and 4 describe various embodiments of landscaping support components (1), anchoring elements, and plugs, for example. Although each such component may be made separately, such components may also be incorporated into a kit (either as separate components to be assembled on site or as a complete landscaping support component) in which each component is configured to work with each other component. For example, a kit may be sold with one or more landscaping support components (1) and one or more of the following components: one or more anchoring elements (70), one or more edge restraints (60), one or more plugs sized to fit one another, and/or instructions for installation and use. Based on the disclosure provided herein, one of ordinary skill in the art will recognize a multitude of possible kit combinations.

The following examples are intended to illustrate, rather than limit, the invention.

EXAMPLES

Example 1. Use of the Landscaping Support Component to Support an Enclosed Walkway Landscaping support component (1) is placed on level compacted gravel or a similar base material that meets industry standard requirements. Landscaping support component (1) is then anchored in place with anchoring elements (e.g., landscape spikes) and infilled with fine material (e.g., gravel). The fine material is then compacted within landscaping support component (1) to uphold the walkway components to a desired height. After installation of landscaping support component (1), edge restraint (60) may be installed to abut side wall (30) at notch (50).

Example 2. Use of the Landscaping Support Component Containing Plugged Perforations to Support an Enclosed Walkway The installer surveys the area and determines the optimal number and position of anchoring points. The installer then removes the plugs from perforations in planar base (10) of landscaping support component (1), where desired, sets the structure in place, and uses the perforations as a guide for placement of the anchoring elements (e.g., landscape spikes). Landscaping support component (1) is then infilled with compacted fine material (e.g., gravel) and walkway components are set in place.

Example 3. Use of the Landscaping Support Component to Support Non-Standard Sized Walkways Landscaping support component (1) can be fabricated out of a rigid, yet pliable material (e.g., plastic) that provides adaptability to landscaping support components (1) of multiple sizes. For instance, a walkway may be a width that exceeds the capacity of landscaping support component (1) to enclose. In this instance, an installer is able to cut landscaping support component (1) at pre-indicated guide lines that will bisect the structure and enable a "book end" installation of each half at the outermost edges where the walkway meets a step, which are the regions in most need of protection of displacement. In another instance, the walkway may be of a lessor width than that of landscaping support component (1). In this case, landscaping support component (1) can be cut at two pre-indicated guide lines that will remove a middle portion and enable a "book end" installation that will tightly enclose the walkway.

Example 4. Use of the Landscaping Support Component to Anchor an Enclosed Walkway to a Step Landscaping support component (1) can be anchored to a step or other rigid landscaping structure with the use of an anchoring element (e.g., one or more concrete nails) during installation. The anchoring to a step can be done in combination with ground anchoring elements (e.g., landscape spikes), for additional anchoring, or in place of ground anchoring elements.

Example 5. Use of the Landscaping Support Component to Support Steps Stacked Up a Grade Landscaping support component (1) can be used to support steps stacked up a grade to prevent the erosion of base material under the steps or the landscape preceding the first step or succeeding the last step. Landscaping support component (1) can be installed so as to abut each step and enclose the material underlying each subsequent step or the material preceding the first step or succeeding the last step.

OTHER EMBODIMENTS

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims.

Other embodiments are within the claims

The invention claimed is:

1. A landscaping support component, comprising:
(i) a substantially planar base comprising a horizontal surface and comprising one or more perforations, wherein the substantially planar base is configured to retain infill material, has a width of 1.0-8.0 ft from a left edge to a right edge, and has a length of 1.0-4.0 ft from a front edge to a rear edge;
(ii) a front wall comprising a vertical surface with upper and lower edges, wherein the lower edge of the vertical surface is connected along an entire length of the front edge of the substantially planar base, the front wall and the substantially planar base are connected solely at the lower edge of the vertical surface, the vertical surface extends substantially perpendicularly upwards from the substantially planar base, and the front wall has a height of 0.4-1.0 ft; and
(iii) first and second opposing side walls that are substantially perpendicular to the substantially planar base, wherein the first and second side walls have upper and lower edges and front and rear edges, respectively, wherein:
an entire length of the lower edge of the first side wall is connected to the left edge of the substantially planar base and the front edge of the first side wall is connected along an entire length of a left edge of the front wall; and
an entire length of the lower edge of the second side wall is connected to the right edge of the substantially planar base and the front edge of the second side wall is connected along an entire length of a right edge of the front wall; and
wherein the landscaping support component is configured for installation at the intersection of a walkway and a step.

2. The landscaping support component of claim 1, wherein the substantially planar base comprises one perforation.

3. The landscaping support component of claim 2, wherein the perforation comprises a drainage or weep hole.

4. The landscaping support component of claim 2, wherein the perforation permits passage of a nail or spike.

5. The landscaping support component of claim 1, wherein the landscaping support component comprises a single unitary piece of rigid material.

6. The landscaping support component of claim 1, wherein the substantially planar base, front wall and/or opposing side walls are modular and are detachably connected.

7. The landscaping support component of claim 1, wherein one or both of the opposing side walls comprise a notch.

8. The landscaping support component of claim 1, wherein the substantially planar base comprises at least one groove.

9. The landscaping support component of claim 1, wherein:
i) the landscaping support component comprises at least one breakaway tab, the removal of which creates a perforation;
ii) the landscaping support component comprises at least one visible indication providing a guide for cutting;
iii) the landscaping support component comprises at least one visible indication providing a guide for forming a perforation;
iv) the landscaping support component comprises a semipermeable material;
v) the opposing side walls of the landscaping support component are about 0.5-8.0 ft. apart; and/or
vi) the substantially planar base has a length of about 1.0-1.5 ft. 0.5-1.0 ft.

10. The landscaping support component of claim 9, wherein:
i) the landscaping support component further comprises a plug for insertion into the perforation resulting from removal of the breakaway tab; or
ii) the at least one visible indication providing a guide for cutting is a line that is parallel to the first and second opposing side walls.

11. A method for installing the landscaping support component of claim 1 into a landscape comprising the steps of:
(a) placing the landscaping support component on level ground where the front side of the landscaping support component will be flush with a hardscaping element, and
(b) installing hardscape components within the bounds of the landscaping support component.

12. The method of claim 11, wherein the landscaping support component is infilled with material that will uphold hardscape components.

13. The method of claim 12, wherein the infill material is compacted or is sand and/or gravel.

14. The method of claim 11, wherein the hardscaping element is a stairway.

15. The method of claim 11, wherein the hardscape components are pavers, bricks, planks, and/or stones.

16. The method of claim 11, further comprising installing at least one anchoring element through:
    i) the substantially planar base of the landscaping support component;
    ii) the front wall of the landscaping support component; and/or
    iii) at least one of the first and second opposing side walls of the landscaping support component.

17. The method of claim 16, wherein the at least one anchoring element is a substantially cylindrical object, a metal spike and/or nail.

18. A kit comprising the landscaping support component of claim 1, wherein the kit further comprises at least one of:
    i) one or more metal spikes;
    ii) one or more plugs;
    iii) one or more edge restraint; and/or
    iv) installation instructions.

* * * * *